UNITED STATES PATENT OFFICE.

STUART P. MILLER AND FREDERICK H. RHODES, OF PHILADELPHIA, PENNSYLVANIA, ASSIGNORS TO THE BARRETT COMPANY, A CORPORATION OF NEW JERSEY.

PRODUCTION OF RESINS.

1,365,423.     Specification of Letters Patent.     Patented Jan. 11, 1921.

No Drawing.     Application filed August 28, 1919. Serial No. 320,431.

*To all whom it may concern:*

Be it known that we, (1) STUART P. MILLER and (2) FREDERICK H. RHODES, citizens of the United States, residing at (1) 6503 York road and (2) 225 Mount Pleasant Ave., in the county of Philadelphia and State of Pennsylvania, have invented certain new and useful Improvements in the Production of Resins, of which the following is a specification.

This invention relates to the preparation of resins from naphthas containing polymerizable constituents, such as coumarone, indene, etc., and has for its object the production of such resin in a relatively pure state and in a rapid and economical manner.

It is well known that when a naphtha containing coumarone or indene is treated with sulfuric acid the coumarone and indene are polymerized. When the naphtha containing the polymerized coumarone and indene in solution is separated from the polymerizing acid, neutralized with a solution of an alkali, separated from the alkaline solution, washed, and distilled to remove unpolymerized material, the polymerized coumarone and indene remain behind in the still as a liquid which solidifies to a resin on cooling. This resin is commonly known as paracoumarone or para-indene.

The naphtha after the polymerization with sulfuric acid retains in suspension a small amount of sulfuric acid and of the sulfonic acids formed by the reaction of some of the polymerizing acid upon certain of the constituents of the naphtha. Before this polymerized naphtha can be distilled to recover the resins these last traces of acid must be neutralized by agitating the naphtha with a solution of an alkali, as, for example, sodium hydroxid. If this neutralization step is omitted the small amounts of acid retained by the naphtha will cause the resin obtained by the distillation of the naphtha to be very dark and to be less valuable for many of the purposes for which it is used in the arts.

After the neutralization of the naphtha the major portion of the alkaline solution (containing small amounts of alkali sulfates and sulfonates) separates readily from the naphtha, and may be drawn off. A small amount of the alkaline solution, however, remains suspended in the oil and cannot be separated by allowing the oil to stand for any economically practicable length of time. The previously described and commonly used method of removing the small amounts of alkali and alkali salts retained in the oil by the formation of this above described suspension is to agitate the neutralized oil with successive portions of water, settling and removing each successive portion of wash water, until the ash content of the oil is sufficiently reduced. If this washing with water is omitted, the resin obtained after distilling off the volatile constituents of the naphtha will contain appreciable amounts of non-combustible impurities, as, for example, sodium sulfate and sodium hydroxid. The presence of these non-combustible impurities may cause the resin to be cloudy, to absorb water, and to turn white when exposed to water, and therefore renders it less valuable for many of the purposes for which it is used in the arts.

It has been found that in this washing of the neutralized naphtha after polymerization the water tends to form an emulsion from which the water separates only very slowly. In some cases it is necessary to allow the mixture of water and naphtha to stand for five or six days before even approximately complete separation occurs.

We have discovered that if a solution of an acid, is used for washing the neutralized naphtha, the separation of the wash solution from the naphtha takes place much more rapidly than when water alone is used for the washing. The acids to be used are preferably mineral acids which can be steam distilled at temperatures below the decomposing temperatures of the resins. Moreover, when a solution of such an acid is used for washing the neutralized naphtha the formation of emulsions of the wash solution in the naphtha is minimized, and substantially complete separation of the wash solution from the naphtha is easily secured. For this purpose the concentration of the solutions may be varied over somewhat wide limits, the most advantageous concentration depending upon such factors as the particular acid used, the particular naphtha being treated, the extent of the polymerization, the amount and density of the acid used in the polymerization step, the neutralizing agent, etc. Satisfactory results have been obtained, for example, with an aqueous hydrochloric acid solution containing about 3% by weight of hydrochloric acid. The amount of solution used may be varied without departing from the spirit and scope of the invention.

Some of the advantages gained by the use of a solution of an acid for washing neutralized naphtha are as follows:

The time of washing is reduced from two days or longer to less than one day.

The separation of the wash solution from the naphtha takes place very much more sharply than in any of the previous processes, so that losses of valuable material due to the difficulty of separating the wash solution from the naphtha are minimized.

It is apparent, therefore, that the use of a solution of an acid for washing the neutralized naphtha will effect a considerable saving in the time required for, and in the loss of valuable material incident to the production of a given amount of resin from a given crude material, and will, therefore, effect a considerable saving in the cost of manufacturing the resin.

We have also discovered that by the use of a solution of an acid, as, for example, hydrochloric acid, it is possible to omit the neutralization of the naphtha after polymerization and to wash the polymerized naphtha directly in the acid solution. It is evident that by the omission of this neutralization step a considerable saving in both time and material is effected.

Having thus described our invention, we claim as new and desire to secure by Letters Patent:

1. In the process of producing resin from naphtha, the step which consists in washing said naphtha, after polymerizing polymerizable bodies therein, with a solution of an acid.

2. In the process of producing resin from naphtha, the step which consists in washing said naphtha, after polymerizing polymerizable bodies therein, with a solution of a mineral acid.

3. In the process of producing resin from naphtha, the step which consists in washing said naphtha, after polymerizing polymerizable bodies therein, with a solution of hydrochloric acid.

4. In the process of producing resin from naphtha, the step which consists in washing said naphtha, after polymerizing polymerizable bodies therein with a solution containing about 3% of hydrochloric acid.

5. In the process of producing resin from naphtha, the step which consists in washing said naphtha, after polymerizing polymerizable bodies therein and neutralizing the same, with a solution of an acid.

6. In the process of producing resin from naphtha, the step which consists in washing said naphtha, after polymerizing polymerizable bodies therein and neutralizing the same, with a solution of a mineral acid.

7. In the process of producing resin from naphtha, the step which consists in washing said naphtha, after polymerizing polymerizable bodies therein and neutralizing the same, with a solution of hydrochloric acid.

8. In the process of producing resin from naphtha, the step which consists in washing said naphtha, after polymerizing polymerizable bodies therein and neutralizing the same, with a solution containing about 3% of hydrochloric acid.

In testimony whereof we affix our signatures.

STUART P. MILLER.
FREDERICK H. RHODES.